March 22, 1966 R. C. LAMY 3,242,467

TEMPORARY STORAGE REGISTER

Filed June 7, 1960 2 Sheets-Sheet 1

INVENTOR
RICHARD C. LAMY

BY

MITCHELL & BECHERT
ATTORNEYS

United States Patent Office 3,242,467
Patented Mar. 22, 1966

3,242,467
TEMPORARY STORAGE REGISTER
Richard C. Lamy, San Jose, Calif., assignor to International Business Machines Corporation, Poughkeepsie, N.Y.
Filed June 7, 1960, Ser. No. 34,513
6 Claims. (Cl. 340—172.5)

Figures 1, 2, 2A:
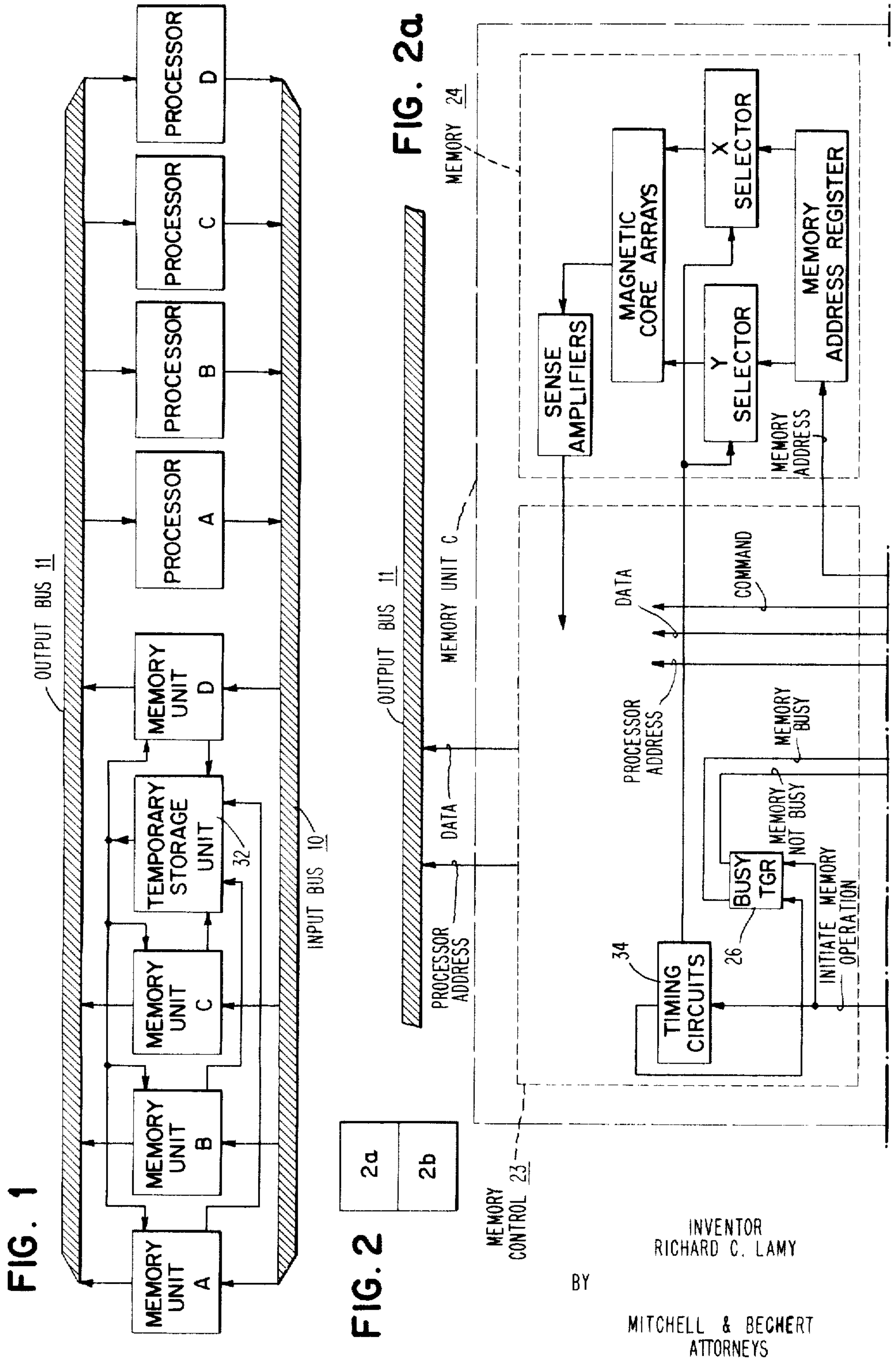

This invention relates to data transfer systems and, more particularly, to arrangements for coordinating the transfer of data between a plurality of processors and multiple memory units.

Until recently, high-speed electronic data processing systems generally consisted of a computer or central processing unit, a memory for storing instructions and data, a plurality of independent input-output units and a control or synchronizing mechanism for controlling and synchronizing the operation of the system. However, at the present time, large-scale data processing requirements have exceeded the capacity of such systems. It has become necessary to enlarge such systems to include several processors and multiple memory units.

These enlarged systems utilize a bus network whereby each independently operating processor may communicate with any one of the multiple memory units. In such network, each processor is commonly connected via a memory input bus to the multiple memory units and memory addresses so that stores data and store/fetch commands may pass from each of the plurality of processors over the input bus to the appropriate memory unit. Additionally, each memory unit is commonly connected via a memory output bus to the plurality of processors and processor addresses so that fetch data may pass from each of the multiple memory units over the output bus to the appropriate processor.

In these enlarged systems, a selected memory unit will store data from or fetch data to a commanding processor if such memory unit is not at that time busy storing data or fetching data for another one of the plurality of processors. If the selected memory unit is busy, however, the command cannot be accepted and must be retransmitted at a later time. This presents no problem in those cases where the data being handled by the processors is not lost with delay as, for example, in the computing type of processor. On the other hand, if the processor is handling a continuous flow of data, as in the case of an input-output data handling type of processor, access to a particular memory must be obtained within a definite period of time or the data will be lost.

Accordingly, it is an object of the present invention to provide an improved arrangement for coordinating data transfer between a plurality of processors and multiple memory units.

A further object of the invention is to provide an improved system for establishing priority between a plurality of data processors seeking access to a particular memory unit.

An apparatus illustrating certain aspects of the invention may include a temporary storage unit associated with such memory unit, a processor recognition unit for providing a first signal indicative of a request made by the data processor to which priority is to be given, and busy signal means for providing second and third signals indicating that said memory unit is busy or not busy, respectively. The apparatus also includes control means responsive to the presence of the third signal for rendering the memory unit receptive to a request, and responsive to the presence of the second signal for rendering the memory unit non-receptive to a request. The control means is further adapted to pass a request into the temporary storage unit in response to the presence of both the first and second signals, and in response to the substitution of the third signal for the second signal to render the memory unit receptive to the request in the temporary storage unit in priority to any other request.

Figure 2B:
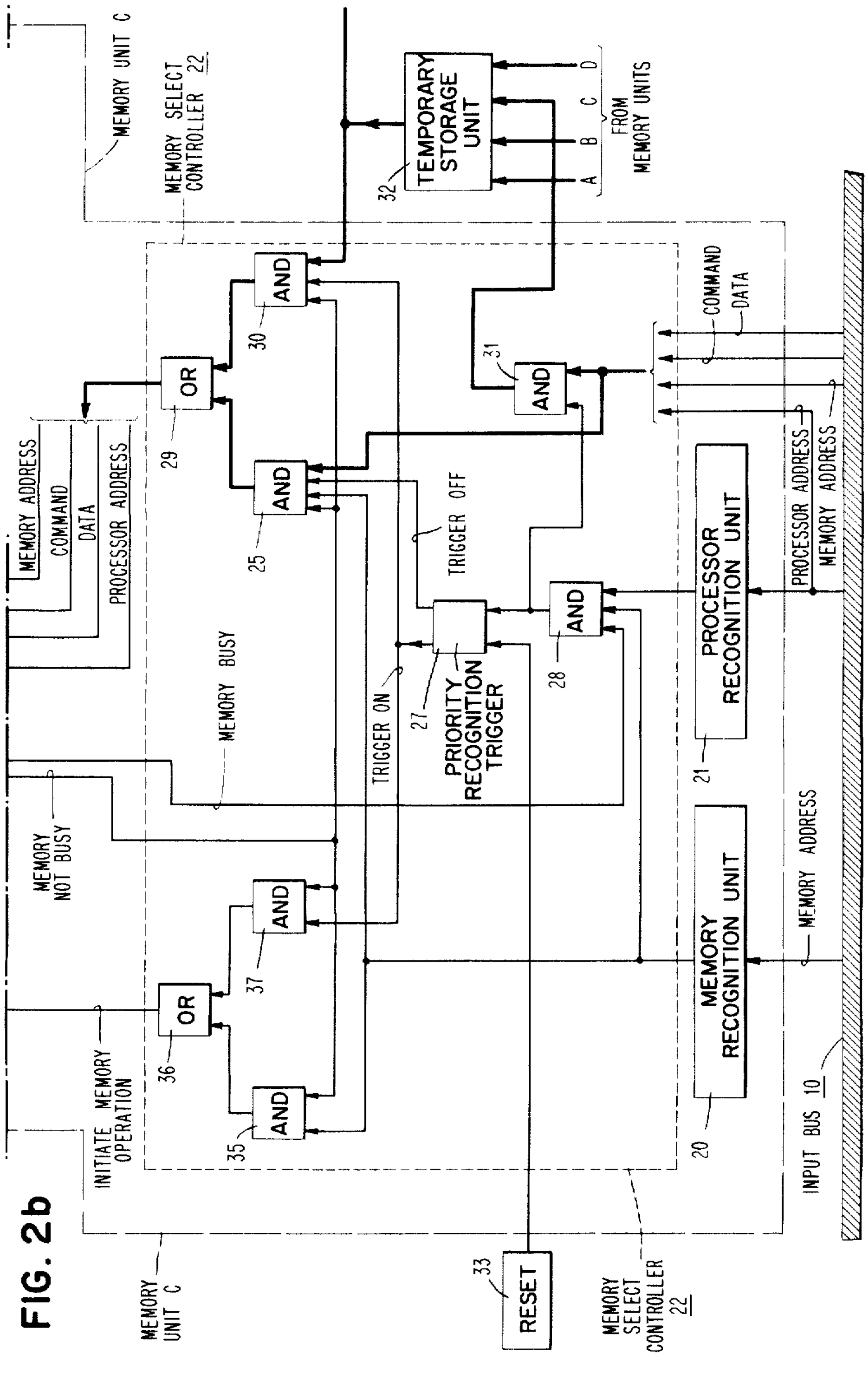

A complete understanding of the invention may be obtained from the following detailed description of apparatus forming specific embodiments thereof, when read in conjunction with the appended drawings, in which:

FIG. 1 is a block diagram of a data processing system forming one embodiment of the invention; and FIGS. 2, 2*a* and 2*b* are block diagrams illustrating the details of a memory unit forming part of the system of FIG. 1.

FIGURE 1 illustrates a data processing system which utilizes a plurality of processors A, B, C and D and a plurality of memory units A, B, C and D. In this system, a memory input bus 10 and a memory output bus 11 are provided. The inputs and the outputs of all the memory units are connected in common to the input bus and the output bus, respectively. On the other hand, the inputs and the outputs of all the processors are connected in common to the output bus and the input bus, respectively.

The advantage of this enlarged system is, of course, the increased data handling capacity which results from the utilization of a plurality of processors and memory units. In operation, the input and output buses 10 and 11 act as highways shuttling data between selected processors and memory units. Some form of identification must, therefore, accompany the data in order to guide it to the appropriate processor or memory unit.

Accordingly, assume that processor A has completed a computation and wishes to store data in memory unit C. It injects into the input bus 10, along with the data, coded signals which contain information as to the memory address, the processor address, and the command. In this example, the memory address would indicate that the data is to go to memory unit C, the processor address would indicate that the data comes from the processor A, and the command signal would indicate that the data is to be stored. If, on the other hand, the processor A required data from the memory unit C, the command signal would so indicate.

In this operation, the processors apply their requests to the input bus cyclically in a preselected sequence. On the other hand, each memory unit searches the input bus 10 for its own address, and when it finds it, gates in the address, command and data signals. Accordingly, each processor has the same chance of using a memory unit. That is to say, a formerly busy memory unit will, upon the completion of its operation, accept the request which emanates from that processor which is the first in the established time sequence to produce the requisite address.

Thus, for example, if processor A makes a request of memory unit C when that memory unit is busy, the request is lost for that particular time cycle and must be repeated. This normally presents no problem despite the fact that processor A takes its same relative time position in the established cycle and therefore stands the risk of having another processor, which makes a later request, obtain access to memory unit C before it does.

In some cases, however, such operation is intolerable. For example, let it be assumed that the processor D is operating with data which is transient in nature. In that event, a request made by the processor D to a memory unit is urgent in nature in that the data to be stored or the data required must be stored or provided immediately. Accordingly, the present invention has provided a data transfer arrangement whereby urgent requests in a multiple memory unit system are given priority over requests which are not as urgent in nature.

An arrangement in accordance with the present invention is illustrated in FIG. 2. Therein, the memory unit C of FIG. 1 is shown in detail, it being understood that the other memory units may be similarly constructed.

Functionally, the memory unit C may be divided into five units; a memory recognition unit 20, a processor recognition unit 21, a memory select controller 22, a memory control 23, and the actual memory portion 24.

The memory recognition unit 20 is standard equipment in multiple memory systems and serves to distinguish the coded signal addressed to its memory unit from any others. It may take a variety of forms well known in the art, but is normally adapted to be set to recognize a preselected code and to produce an output signal in response to the application of only that code. In view of this, the unit 20 has been shown in block form.

The processor recognition unit 21 may also be of the same nature as is the unit 20. Its function in the present invention will be described hereinafter.

The memory select controller 22 serves to establish the desired priority. It represents a substantial portion of the contribution of the present invention and for that reason is shown in the required detail.

The memory control unit 23 is a standard arrangement in the art for controlling the operation of the memory 24. For that reason only those portions of the control unit are shown which cooperate with the select controller 22.

The memory 24 may assume any of a variety of standard forms. In the illustrated embodiment, it is shown to be of the magnetic core type.

Preparatory to the description of its operation, it should first be noted that the memory unit C is adapted to have a specified memory cycle of a preselected duration. A timing circuit 34 is provided in the memory control 23 for this purpose. The timing circuit is adapted to be started on its timing cycle in response to the application of a signal thereto from the select controller 22, indicating that the memory operation is to be initiated.

Furthermore, the memory unit C is adapted to produce an indication as to whether it is busy or not. In this embodiment, this is effected by means of a busy trigger circuit 26. The circuit 26 is advantageously a switching device having two stable states. The device is adapted to be switched into a preselected one of its states, which state produces a signal on a memory busy line, in response to the application of the same initiate memory operation signal which is applied to the timing circuit 34. The device is further adapted to be switched into its other state, which state produces a signal on a memory not busy line, in response to the application of a signal to it from the timing circuit 34, indicating the termination of memory operation. A block has been utilized to represent the switching device 26 since such devices are well known in the art.

The production of the initiate memory operation signal is accomplished in the following manner. As indicated, when the memory recognition unit 20 receives its address, it produces an output signal. This signal is applied to one of the inputs of a two-input AND circuit 35. The other input of the AND circuit 35 is derived from the memory not busy line of the trigger circuit 26. Accordingly, the AND circuit 35 produces the initiate memory operation signal (which is applied through an OR circuit 36 to the trigger 26 and the timing circuit 34) when the two conditions of memory not busy and memory recognition are fulfilled.

The initiate memory operation signal may also be produced under another set of conditions through another two-input AND circuit 37. This operation will be described later in the specification.

Three different operating condition possibilities apply to the memory unit C.

In the first possibility, the memory unit C is not busy and any one of the processors, for example processor A, makes a request. In such case, the memory recognition unit 20 produces a signal because of the application of the appropriate address. This signal is applied to one of three control inputs of a four-input AND circuit 25 in the select controller 22. Another control input to this AND circuit comes from the memory not busy line of the busy trigger 26. The third control input is derived from the trigger OFF line of a priority recognition trigger circuit 27 in the select controller 22.

The operation and purpose of the trigger 27 will be described later in the specification. At this point, it suffices to say that the trigger 27 is turned on only upon the production of an output signal from an AND circuit 28 in the select controller. With the given operating conditions, the AND circuit 28 is not operated in view of the fact that one of its inputs is derived from the memory busy line.

Accordingly, all three control inputs are applied to the AND circuit 25 when the memory unit is not busy. The fourth input to the AND circuit 25 is the composite of information applied to the memory unit from the input bus 10. This information is therefore permitted to pass on through an OR circuit 29 into the memory control 23 and the memory 24. In this way, the memory unit when not busy is rendered receptive to any of the processor units making a request.

In the second condition of operation, the memory unit C is busy and a processor, for example the processor A, which does not operate with data of an urgent nature, makes a request. In that event, the AND circuit 25 is not operated in view of the fact that the memory not busy line does not produce a signal. Consequently, the information applied to the signal input of the AND circuit 25 will not get through to the memory control 23 and to the memory 24. The processor A will therefore have to repeat its request at a later time.

It should be noted that the AND circuit 28 is also not operated under this second set of conditions despite the fact that the memory busy line produces a signal. This is because the processor recognition unit 21 does not produce an output. It will be remembered that the processor recognition unit is the same type of circuit as is the memory recognition unit 20. Consequently, it may be set to recognize a preselected coded address and to produce an output only upon the application of such an address. In accordance with the present invention, the processor recognition unit 21 is set to produce an output only in response to the application of an address identifying a processor which is working with urgent data. Since processor A is not of that category, no such output is produced and the AND circuit 28 is not operated.

The third operating condition occurs when the memory unit C is busy and the processor D (which does operate with urgent data) makes a request. In such case, the AND circuit 28 is operated. This causes a signal to be applied to the control input of a two-input AND circuit 31. It will be noted that information from the input bus 10 is applied to the signal input of the AND circuit 31 as well as to the signal input of the AND circuit 25, and that the output of the AND circuit 31 is connected to a temporary storage unit 32. Accordingly, the operation of the AND circuit 31 by the AND circuit 28 passes this information into the temporary storage unit. In other words, the AND circuits 28 and 31 see to it that information coming from the urgent processor D is not rejected despite the fact that the memory unit is busy.

Since the temporary storage unit 32 may take a variety of forms well known in the art, it is shown in block form in the figures. It will be noted in FIG. 1 that the unit 32 may be connected in common to all of the memory units to act as a temporary storage means for them all. It is, of course, possible to provide an individual temporary storage unit for each memory unit.

The operation of the AND circuit 28 also causes another action to occur which does not occur under the previous two sets of operating conditions. It provides an input to the priority recognition trigger circuit 27 which turns that circuit on. As a result, the AND circuit 25 is deprived of one of its control inputs. On the other hand, a trigger ON signal is applied from the trigger circuit 27 to a three-input AND circuit 30, the output of which is also connected to the OR circuit 29. However, the AND circuit 30 is prevented from operating at this juncture because of its dependence upon the memory not busy line.

Assume now that the memory unit C has completed the function which maintained it busy at the time that the request was made by the processor D. Normally, if the processor D request had not been made, the consequent switching of the busy trigger to its non-busy state would open up the memory unit (through AND circuit 25) to the first request on the input bus having the proper address. However, this is not now the case since the AND circuit 25 is maintained inoperative by the trigger OFF line.

The function of the priority recognition trigger may now be understood. When the memory unit returns to its non-busy state, the AND circuit 28 ceases to produce an output because of the lack of a memory busy input signal. As a result, any indication within the system that a request had been made by a processor handling urgent data at a time when the memory unit was busy would be lost. This information is required for the purpose of maintaining the AND circuit 25 closed as described above and for other purposes to be described. The storage of this information is provided by the priority recognition trigger 27.

To serve this end, the trigger 27 may be the same type of switching device as is the busy trigger 26. That is to say, it may be a switching device having two stable states. In this case, the device is switched into one of the states, which state produces a signal on the trigger ON line, in response to the application of an output from the AND circuit. Storage is effected in that the device is adapted to remain in this ON state until switched to its other state, which other state produces a signal on the trigger OFF line, in response to the application of an input from a reset device 33.

In this case, therefore, because of the ON condition of the trigger 27, the memory unit is not opened up to a request on the input bus 10 despite the production of a memory not busy signal. Instead, and because of the ON condition of the trigger 27, the production of the memory not busy signal opens up the memory unit to the information stored in the temporary storage unit 32. This is effected by means of the AND circuit 30 which has the memory not busy line and the trigger ON line for its two control inputs and the output of the temporary storage unit 32 for its signal input.

It should be noted that under these conditions an initiate memory operation signal may not be produced due to the lack of a signal from the memory recognition unit 20. It is for this reason that the AND circuit 37 is provided. The two inputs to this AND circuit are derived from the memory not busy line and from the trigger ON line. Thus, with the trigger circuit 27 in its ON condition, an initiate memory operation signal is produced as soon as the previous memory operation terminates.

After the introduction of the information from the temporary storage unit 32 into the memory unit, the storage of information in the priority recognition trigger is no longer required. The trigger is therefore then returned to its OFF condition by the reset means 33 to be in readiness for succeeding requests.

In this way, the data transfer system of the present invention gives priority to a request made by a processor working with data of an urgent nature. It does so by temporarily storing the information sent by such processor while the memory unit is busy, by blocking any subsequent requests which may be made immediately after the termination of the busy cycle, and by permitting the temporarily stored information to pass into the memory unit after the termination of the busy cycle to initiate a succeeding cycle.

It is to be understood that the described embodiments are simply illustrative of the application of the principles of the invention. Numerous other methods may be devised by those skilled in the art which will embody the principles of the invention and fall within the spirit and scope thereof.

What is claimed is:

1. In a data processing system comprising a plurality of data processors and at least one memory unit, means for giving priority to a request for said memory unit made by a preselected one of said data processors, said priority means comprising a temporary storage unit, a processor recognition unit coupled to said data processors, said processor recognition unit being adapted to provide a first signal indicative of a request made by said preselected data processor, busy signal means coupled to said memory unit, said busy signal means being adapted to provide a second and a third signal indicating that said memory unit is busy or not busy, respectively, and control means coupled to said memory unit, said temporary storage unit, said processor recognition unit, and said busy signal means, said control means being responsive to the presence of said third signal for rendering said memory unit receptive to a request, and responsive to the presence of said second signal for rendering said memory unit non-receptive to a request, said control means being further responsive to the presence of both said first and second signals for passing a request into said temporary storage unit, and to the subsequent substitution of said third signal for said second signal to render said memory unit receptive to the request in said temporary storage unit in priority to any other request.

2. Priority means according to claim 1, wherein said control means comprises a first AND circuit adapted to provide an output in response to the application thereto of said first and second signals, a priority storage device connected to the output of said first AND circuit and adapted to produce an ON signal or an OFF signal responsive to the application or non-application, respectively, of an output from said first AND circuit, a second AND circuit adapted to pass a request into said memory unit in response to the application thereto of said third and OFF signals, a third AND circuit adapted to pass a request into said temporary storage unit in response to an output from said first AND circuit, a fourth AND circuit adapted to pass a request in said temporary storage unit into said memory unit in response to the application thereto of said third and ON signals, and means for resetting said priority storage device to an OFF signal condition after a request in said temporary storage unit has been passed into said memory unit.

3. Priority means according to claim 2, which includes a memory recognition unit for providing a fourth signal indicative of a request for said memory unit, said first and second AND circuits being adapted to operate only when said fourth signal is also applied thereto.

4. Priority means according to claim 2, which includes means for initiating the operation of said memory unit, said means comprising a fifth AND circuit adapted to initiate said operation in response to the application of a request signal and said third signal thereto, and a sixth AND circuit adapted to initiate said operation in response to the application of said third and ON signals.

5. Priority means according to claim 3, which includes means for initiating the operation of said memory unit, said means comprising a fifth AND circuit adapted to initiate said operation in response to the application of said third and fourth signals, and a sixth AND circuit adapted to initiate said operation in response to the application of said third and ON signals.

6. In a data processing system comprising a plurality of data processors, a plurality of memory units, a memory input bus connected in common to said data processors and memory units, and a memory output bus connected in common to said data processors and memory units, priority means associated with each of said memory units for giving priority to a request for one of said memory units made by a preselected one of said processors, said priority means comprising a temporary storage unit, a memory recognition unit coupled to said memory input bus, said memory recognition unit being adapted to provide a first signal indicative of a request for said one memory unit, a processor recognition unit coupled to said memory input bus, said processor recognition unit being adapted to provide a second signal indicative of a request made by said preselected data processor, busy signal means coupled to said one memory unit, said busy signal means being adapted to provide a third and a fourth signal indicating that said one memory unit is busy or not busy respectively, and control means coupled to said one memory unit, said temporary storage unit, said one memory recognition unit, said processor recognition unit, and said busy signal means, said control means being responsive to the presence of said first and fourth signals for rendering said one memory unit responsive to a request, and responsive to the presence of said third signal for rendering said one memory unit non-responsive to a request, said control means being further responsive to the presence of said first, second and third signals for passing a request into said temporary storage unit, and to the subsequent substitution of said fourth signal for said third signal to render said memory unit responsive to the request in said temporary storage unit in priority to any other request.

References Cited by the Examiner

UNITED STATES PATENTS

| | | | |
|---|---|---|---|
| 2,951,234 | 8/1960 | Spielberg | 340—172.5 |
| 3,018,959 | 1/1962 | Thomas | 235—167 |
| 3,061,192 | 10/1962 | Terzian | 340—172.5 |

OTHER REFERENCES

Pages 101–107, 12/59—Chao, The System Organization of MOBIDIC B, Eastern Joint Computer Conference.

ROBERT C. BAILEY, *Primary Examiner.*

EVERETT R. REYNOLDS, MALCOLM A. MORRISON, *Examiners.*